US008804988B2

(12) United States Patent
Solum et al.

(10) Patent No.: US 8,804,988 B2
(45) Date of Patent: Aug. 12, 2014

(54) CONTROL OF LOW POWER OR STANDBY MODES OF A HEARING ASSISTANCE DEVICE

(75) Inventors: Jeffrey Paul Solum, Deephaven, MN (US); Michael Helgeson, New Richmond, WI (US); Stephen Paul Flood, Eden Prairie, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 241 days.

(21) Appl. No.: 12/981,035

(22) Filed: Dec. 29, 2010

(65) Prior Publication Data

US 2011/0249836 A1 Oct. 13, 2011

Related U.S. Application Data

(60) Provisional application No. 61/323,520, filed on Apr. 13, 2010.

(51) Int. Cl.
*H04R 25/00* (2006.01)
*H04M 1/00* (2006.01)

(52) U.S. Cl.
USPC ............................ 381/312; 381/323; 455/574

(58) Field of Classification Search
USPC ........... 381/312, 314, 315, 328, 323; 455/574
See application file for complete search history.

(56) References Cited

U.S. PATENT DOCUMENTS 5,083,312 A 1/1992 Newton et al.
5,721,783 A 2/1998 Anderson
5,768,397 A 6/1998 Fazio
5,966,639 A 10/1999 Goldberg et al.
6,021,207 A 2/2000 Puthuff et al.
6,088,339 A 7/2000 Meyer
6,438,245 B1 8/2002 Taenzer et al.
6,633,645 B2 10/2003 Bren et al.
6,694,034 B2 2/2004 Julstrom et al.
(Continued)

FOREIGN PATENT DOCUMENTS

EP 1185138 A2 3/2002
EP 1519625 A2 3/2005
(Continued)

OTHER PUBLICATIONS

"U.S. Appl. No. 11/447,617, Non Final Office Action Mailed Aug. 31, 2011", 29 pgs.

(Continued)

*Primary Examiner* — Curtis Kuntz
*Assistant Examiner* — Sunita Joshi
(74) *Attorney, Agent, or Firm* — Schwegman, Lundberg & Woessner, P.A.

(57) ABSTRACT

Disclosed herein, among other things, are apparatus and methods to provide improved control of hearing aids and hearing aid applications. In one embodiment, a hearing assistance device includes a microphone, a receiver for playing sound to a wearer, a processor connected to the microphone and the receiver, and a radio connected to the processor. The processor is adapted to enter a low power or standby mode upon receipt of a predetermined command from one or more of the microphone or the radio. The processor is further adapted to exit a low power or standby mode upon receipt of a predetermined command from one or more of the microphone or the radio. Other embodiments are possible without departing from the scope of the present subject matter.

20 Claims, 1 Drawing Sheet

(56) References Cited

U.S. PATENT DOCUMENTS

| | | | | |
|---|---|---|---|---|
| 6,760,457 | B1 | 7/2004 | Bren et al. | |
| 7,062,223 | B2 | 6/2006 | Gerber et al. | |
| 7,075,903 | B1 | 7/2006 | Solum | |
| 7,412,294 | B1 | 8/2008 | Woolfork | |
| 7,529,565 | B2 | 5/2009 | Hilpisch et al. | |
| 7,702,121 | B2 | 4/2010 | Husung et al. | |
| 8,169,938 | B2 | 5/2012 | Duchscher et al. | |
| 8,194,901 | B2 | 6/2012 | Alber et al. | |
| 8,280,086 | B2 | 10/2012 | Topholm | |
| 2002/0030871 | A1 | 3/2002 | Anderson et al. | |
| 2003/0059073 | A1 | 3/2003 | Bren et al. | |
| 2003/0215106 | A1 | 11/2003 | Hagen et al. | |
| 2004/0052391 | A1 | 3/2004 | Bren et al. | |
| 2004/0193090 | A1 | 9/2004 | Lebel et al. | |
| 2004/0234090 | A1 | 11/2004 | Berg | |
| 2005/0058313 | A1 * | 3/2005 | Victorian et al. | 381/315 |
| 2005/0100182 | A1 | 5/2005 | Sykes et al. | |
| 2005/0111401 | A1 | 5/2005 | Terry | |
| 2006/0274747 | A1 | 12/2006 | Duchscher et al. | |
| 2007/0009123 | A1 | 1/2007 | Aschoff et al. | |
| 2008/0260180 | A1 | 10/2008 | Goldstien et al. | |
| 2009/0010464 | A1 | 1/2009 | Kornagel | |
| 2010/0195836 | A1 | 8/2010 | Platz | |
| 2010/0208631 | A1 | 8/2010 | Zhang et al. | |
| 2010/0246865 | A1 * | 9/2010 | Suurballe | 381/314 |
| 2010/0246866 | A1 | 9/2010 | Swain et al. | |
| 2011/0032071 | A1 | 2/2011 | Tondering | |
| 2011/0090837 | A1 | 4/2011 | Duchscher et al. | |
| 2011/0150251 | A1 | 6/2011 | Solum et al. | |
| 2011/0150252 | A1 | 6/2011 | Solum et al. | |
| 2011/0150254 | A1 | 6/2011 | Solum et al. | |
| 2011/0249837 | A1 | 10/2011 | Galster et al. | |
| 2013/0004002 | A1 | 1/2013 | Duchscher et al. | |

FOREIGN PATENT DOCUMENTS

| | | | |
|---|---|---|---|
| EP | 2012557 | A2 | 1/2009 |
| WO | WO-9641498 | A1 | 12/1996 |
| WO | WO-9848526 | A2 | 10/1998 |
| WO | WO-0209363 | A2 | 1/2002 |
| WO | WO-02061957 | A2 | 8/2002 |
| WO | WO-03008013 | A2 | 1/2003 |
| WO | WO-2005061048 | A1 | 7/2005 |
| WO | WO-2005101731 | A2 | 10/2005 |
| WO | WO-2006133158 | A1 | 12/2006 |
| WO | WO-2009076949 | A1 | 6/2009 |

OTHER PUBLICATIONS

"U.S. Appl. No. 12/980,696, Non Final Office Action mailed", 7 pgs.
"European Application Serial No. 11250442.8, Extended European Search Report mailed Aug. 18, 2011", 6 pgs.
U.S. Appl. No. 11/447,617, Notice of Allowance mailed Mar. 16, 2012, 8 pgs.
U.S. Appl. No. 11/447,617, Response filed Feb. 29, 2012 to Non Final Office Action mailed Aug. 31, 2011, 13 pgs.
U.S. Appl. No. 12/643,540, Final Office Action mailed Jun. 7, 2013, 13 pgs.
U.S. Appl. No. 12/643,540, Non Final Office Action mailed Aug. 16, 2012, 14 pgs.
U.S. Appl. No. 12/643,540, Response filed Jan. 16, 2013 to Non Final Office Action mailed Aug. 16, 2012, 8 pgs.
U.S. Appl. No. 12/823,505 , Response filed Apr. 23, 2013 to Non Final Office Action mailed Jan. 23, 2013, 12 pgs.
U.S. Appl. No. 12/823,505, Final Office Action mailed Jul. 18, 2013, 9 pgs.
U.S. Appl. No. 12/823,505, Non Final Office Action mailed Jan. 23, 2013, 11 pgs.
U.S. Appl. No. 12/823,505, Response filed Dec. 19, 2012 to Restriction Requirement mailed Oct. 19, 2012, 6 pgs.
U.S. Appl. No. 12/823,505, Restriction Requirement mailed Aug. 2, 2012, 6 pgs.
U.S. Appl. No. 12/823,505, Restriction Requirement mailed Oct. 19, 2012, 6 pgs.
U.S. Appl. No. 12/830,892 , Response filed Jul. 1, 2013 to Final Office Action mailed Apr. 1, 2013, 9 pgs.
U.S. Appl. No. 12/830,892, Final Office Action mailed Apr. 1, 2013, 16 pgs.
U.S. Appl. No. 12/830,892, Non Final Office Action mailed Aug. 17, 2012, 15 pgs.
U.S. Appl. No. 12/830,892, Response filed Jan. 16, 2013 to Non Final Office Action mailed Aug. 17, 2012, 8 pgs.
U.S. Appl. No. 12/981,108, Final Office Action mailed Jun. 6, 2013, 11 pgs.
U.S. Appl. No. 12/981,108, Non Final Office Action mailed Aug. 17, 2012, 10 pgs.
U.S. Appl. No. 12/981,108, Response filed Jan. 16, 2013 to Non Final Office Action mailed Aug. 17, 2012, 8 pgs.
European Application Serial No. 10252054.1, Extended Search Report mailed Sep. 14, 2012, 6 pgs.
European Application Serial No. 10252054.1, Response filed Apr. 17, 2013 to Extended European Search Report mailed Sep. 14, 2012, 23 pgs.
European Application Serial No. 11250442.8, Response filed Apr. 17, 2012 to Extended Search Report mailed Aug. 18, 2011, 28 pgs.
"U.S. Appl. No. 12/643,540, Advisory Action mailed Sep. 26, 2013", 2 pgs.
"U.S. Appl. No. 12/643,540, Response filed Sep. 6, 2013 to Final Officer Action mailed Jun. 7, 2013", 7 pgs.
"U.S. Appl. No. 12/823,505, Advisory Action mailed Oct. 4, 2013", 3 pgs.
"U.S. Appl. No. 12/823,505, Non Final Office Action mailed Nov. 4, 2013", 9 pgs.
"U.S. Appl. No. 12/823,505, Response filed Sep. 4, 2013 to Restriction Requirement mailed Aug. 2, 2013", 6 pgs.
"U.S. Appl. No. 12/823,505, Response filed Sep. 18, 2013 to Final Office Action mailed Jul. 18, 2013", 8 pgs.
"U.S. Appl. No. 12/981,108, Advisory Action mailed Oct. 1, 2013", 3 pgs.

* cited by examiner

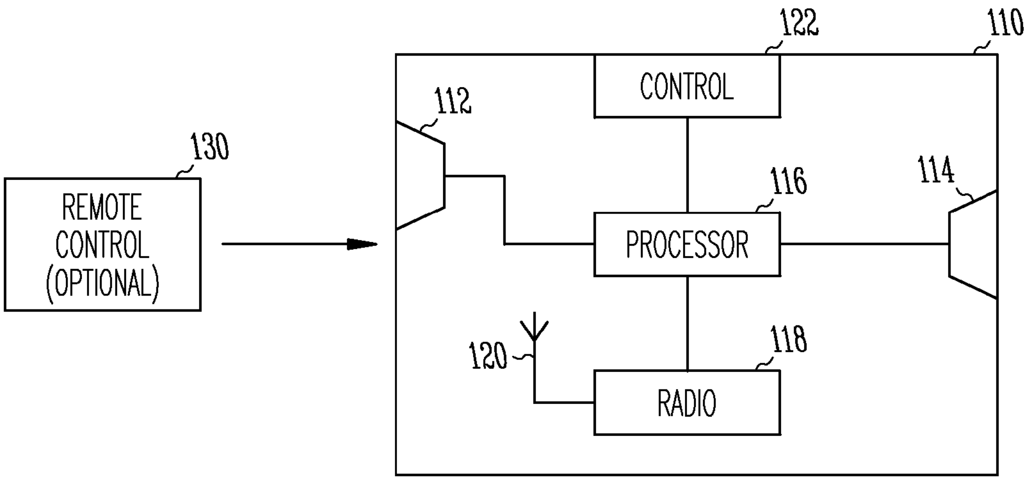
122
110
CONTROL
112
130
116
114
REMOTE CONTROL (OPTIONAL)
PROCESSOR
120
118
RADIO

CONTROL OF LOW POWER OR STANDBY MODES OF A HEARING ASSISTANCE DEVICE

RELATED APPLICATION

The present application claims the benefit under 35 U.S.C. 119(e) of U.S. Provisional Patent Application Ser. No. 61/323,520, filed on Apr. 13, 2010, which is incorporated herein by reference in its entirety.

FIELD OF THE INVENTION

The present subject matter relates generally to controlling functions in a hearing assistance device, and in particular to control of low power or standby modes of a hearing assistance device.

BACKGROUND

Modern hearing assistance devices, such as hearing aids, typically include a digital signal processor in communication with a microphone and receiver. Such designs are adapted to perform a great deal of processing on sounds received by the microphone. More and more hearing aids include a wireless communication option which provides a way to communicate with the hearing aid using another device. Such devices may have their own wireless protocols for communications or may use an industry standard protocol. However, there are situations where the wireless function of the hearing assistance device should be disabled, such as when flying (according to existing FAA rules). There are also situations where the energy consumption could be greatly reduced by placing the wireless radio functions in a hearing assistance device in a low power or standby state.

Hearing assistance device designs typically have a very limited amount of available volume to hold the electronics. A persistent problem is the placement of means to control the device. Hearing assistance devices have limited space to place controls. The limited space issues also magnify the need to conserve power in a hearing assistance device. Accordingly, there is a need in the art for apparatus and methods to provide improved control of a hearing assistance device, including a provision for low power or standby modes of operation of the device.

SUMMARY

Disclosed herein, among other things, are apparatus and methods to provide improved control of hearing aids and hearing aid applications. In one embodiment, a hearing assistance device includes a microphone, a receiver for playing sound to a wearer, a processor connected to the microphone and the receiver, and a radio connected to the processor. The processor is adapted to enter a low power or standby mode upon receipt of a predetermined command from one or more of the microphone or the radio. The processor is further adapted to exit a low power or standby mode upon receipt of a predetermined command from one or more of the microphone or the radio.

In one embodiment, a method of controlling modes of a hearing assistance device is provided. A predetermined command is received at a hearing assistance device processor from one or more of a hearing assistance device microphone or a radio connected to the processor. A low power or standby mode of the hearing assistance device is entered or exited upon receipt of the command. Other embodiments are possible without departing from the scope of the present subject matter.

This Summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

BRIEF DESCRIPTION OF THE DRAWINGS

FIG. 1 shows a block diagram of a hearing assistance device and a remote control according to one embodiment of the present subject matter.

DETAILED DESCRIPTION

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

FIG. 1 shows a block diagram of a hearing assistance device and a remote control according to one embodiment of the present subject matter. Many hearing assistance devices 110, such as hearing aids, include a processor 116 that receives signals from a transducer, such as microphone 112 and processes those signals to be played over a speaker 114 (also known as a receiver in the hearing aid art). The hearing assistance device 110 includes at least one control 122, which can be monitored by processor 116 and operations can be performed according to the control operation. More frequently, hearing assistance devices 110 also include a wireless communications aspect, such as radio 118 and an antenna 120. Radio 118 in various embodiments is a receiver, a transmitter, or a transceiver. Various radio frequencies and modulation techniques can be employed without departing from the scope of the present subject matter. It is understood that the radio 118 and antenna 120 are optional in some embodiments set forth in this disclosure. It is further understood that embodiments that use radio 118 and antenna 120 may only require a reception function to work properly. It is further understood that in bidirectional radio communications that a transceiver function is required.

Optional remote control 130 is a device adapted to perform wireless communication with hearing assistance device 110. In various embodiments it is understood that remote control 130 can be a dedicated remote control device. In various embodiments, remote control 130 is a cellular phone, personal data assistant, iPOD, iPhone, Google Android phone, Blackberry, computer, or other personal wireless device that can be used as set forth herein to perform the remote control function. It is understood that in various embodiments a software or firmware program can be loaded on the device to facilitate its use for the present subject matter.

A. Hearing Assistance Device Standby and/or Low Power Modes

In various embodiments, a user may wish to extend the battery life of his or her hearing assistance device, such as a hearing aid, by putting the hearing aid into a standby or low power mode. In one embodiment, standby mode disables most or all processing of audio information, thus muting the hearing assistance device (hearing aid). The device will enter a low power mode of operation and require another command or condition to wake the device up and return to normal operating mode. Various approaches can be used to enter and exit a low power or standby mode, including, but not limited to the following:

1. Hearing Assistance Device Control

Control 122 can be configured to place the hearing assistance device 110 in standby mode and to return the device to normal operating mode. In one embodiment control 122 is used to toggle the device between operating mode and standby mode. In various embodiments control 122 is a button. In various embodiments control 122 is a touch sensor. In various embodiments control 122 is a proximity sensor. Other controls may be used without departing from the scope of the present subject matter. It is understood that different control operation sequences, including extended operation of the control and delays between operation of the control may be employed to perform mode selection. It is also possible that different controls can be used to change between standby and normal operating modes. For example, any of the wireless commands discussed herein can be used to exit standby mode and enter normal operating mode.

2. Wireless Radio Frequency Command from Remote Control

In one embodiment of the present subject matter, a wireless command is issued from remote control 130 that puts the hearing assistance device 110 in standby mode. In radio frequency wireless applications, radio 118 includes a receiver configured to receive the command, decode it, and to place the hearing assistance device 110 into a form of standby mode. In various embodiments, radio 118 is further configured to periodically or occasionally listen for another command which returns the device to normal operation. Such modes are typically low power modes, such as, but not limited to, the reception mode set forth in U.S. patent application Ser. No. 12/643,540 application incorporated by reference herein. Other methods of exiting the standby state and returning to normal operating mode are possible in combination or in the alternative. In various embodiments, a control on the hearing assistance device 110 is operated to return the device to normal operating mode. For example, a control 122 can be used to sense one or more manual operations (including but not limited to one or more button press, touch sense, or proximity sense) to exit standby mode. Control 122 in various embodiments is a touch or proximity sensor. In various embodiments a return to normal operating mode is performed by opening and closing the battery compartment of the device 110. In various embodiments device 110 returns to a normal operating mode upon certain triggering occurrences, such as a programmable timer reaching a setpoint, or multiple power cycles. In various embodiments a voice command can be detected to change modes. Another remote control approach is set forth in the following commonly owned patent application which is incorporated by reference in its entirety: U.S. Provisional Patent Application Ser. No. 61/220,994, filed Jun. 25, 2009, titled REMOTE CONTROL FOR A HEARING ASSISTANCE DEVICE. Other triggering occurrences are possible without departing from the scope of the present subject matter.

3. DTMF Commands to Change Modes

In various embodiments dual tone multifunction (DTMF) tones are received by the hearing assistance device 110 and operating modes are changed based on the DTMF tones. Such tones can be received acoustically by microphone 112 from any audio source capable of generating such tones. The DTMF tones can also be send via a radio frequency message, received by radio 118, decoded and processed by processor 116 to perform mode changes. It is understood that various tone sequences and combinations can be used to change modes from normal operating mode to standby mode or vice versa. Thus, it is understood that a single tone, pair of tones, or sequence if tones can be employed without departing from the scope of the present subject matter.

In one embodiment a unique DTMF tone or sequence is used to enter standby mode and another unique tone or sequence is used to enter normal operating mode. In further embodiments, the same message could be used to toggle between the modes. In various embodiments, the duration of a tone is used to change modes of the hearing assistance device 110.

In various embodiments, the DTMF tones or sequence of tones is generated by a cellular phone or other telephone device. The cellular phone may include a software or firmware application downloaded to it to convert the cell-phone into a multi-function remote that includes the capability of producing the necessary DTMF tones. Other platforms such as personal digital assistants PDA's, computers, or dedicated DTMF hardware equipped with audio outputs may be used to perform the remote control function. When two hearing aids are worn by a user, to ensure that both aids are enabled or disabled via DTMF it may be necessary to relay that information from one aid to the other via wireless transmissions prior to disabling the transmitter.

In one embodiment the hearing assistance device 110 may use the DTMF detection approach set forth in the following commonly owned patent application: U.S. Provisional Patent Application Ser. No. 61/176,734, filed May 8, 2009, titled CELL PHONE DETECTION FOR HEARING AIDS. Other DTMF approaches may be used without departing from the scope of the present subject matter.

B. Radio Standby and/or Low Power Modes

Modern hearing assistance devices capable of radio frequency wireless communications may require a method to disable the transmit function in certain circumstances. For example, whenever a passenger is aboard an aircraft the device's transmission function may have to be turned off. The Federal Aviation Administration (FAA) and other international air travel administrations restrict the use of electronic devices that emit electromagnetic information while in flight.

Also, when traveling outside their country of origin if communications are not compliant with other devices used in the destination country that the person is visiting it may be beneficial to disable a radio frequency wireless function. Industrial scientific and medical bands (ISM) are set aside for unlicensed operation of radio frequency communication in most countries. These bands differ from country to country in many cases. This makes it necessary for a traveler to be able to disable radio frequency wireless features when traveling outside of a particular regulatory domain.

One type of low power communication approach includes, but is not limited to, the low power approach set forth in U.S. patent application Ser. No. 12/643,540, filed Dec. 21, 2009, titled LOW POWER INTERMITTENT MESSAGING FOR HEARING ASSISTANCE DEVICES, which is hereby incorporated by reference in its entirety.

Various approaches can be used to enter and exit a low power or standby mode, including, but not limited to the following:

1. Hearing Assistance Device Control

Control 122 can be configured to place the radio 118 in standby mode and to return the device to normal operating mode. In one embodiment control 122 is used to toggle the device between operating mode and standby mode. In various embodiments control 122 is a button. In various embodiments control 122 is a touch sensor. In various embodiments control 122 is a proximity sensor. Other controls may be used without departing from the scope of the present subject matter. It is understood that different control operation sequences, including extended operation of the control and delays between operation of the control may be employed to perform mode selection. It is also possible that different controls can be used to change between standby and normal operating modes. For example, any of the wireless commands discussed herein can be used to exit standby mode and enter normal operating mode.

2. Wireless Radio Frequency Command from Remote Control

In one embodiment of the present subject matter, a wireless command is issued from remote control 130 that puts the radio 118 in standby mode. In radio frequency wireless applications, radio 118 includes a receiver configured to receive the command, decode it, and to place the radio 118 into a form of standby or low power mode. In various embodiments, radio 118 is further configured to periodically or occasionally listen for another command which returns the device to normal operation. Such modes are typically low power modes, such as, but not limited to, the reception mode set forth in U.S. patent application Ser. No. 12/643,540 application incorporated by reference herein. Other methods of exiting the standby state and returning radio 118 to normal operating mode are possible in combination or in the alternative. In various embodiments, a control on the hearing assistance device 110 is operated to return the radio 118 to normal operating mode. For example, a control 122 can be used to sense one or more manual operations (including but not limited to one or more button press, touch sense, or proximity sense) to exit standby mode. Control 122 in various embodiments is a touch or proximity sensor. In various embodiments a return to normal operating mode is performed by opening and closing the battery compartment of the device 110. In various embodiments radio 118 returns to a normal operating mode upon certain triggering occurrences, such as a programmable timer reaching a setpoint, or multiple power cycles. In various embodiments a voice command can be detected to change modes of radio 118. Another remote control approach is set forth in the following commonly owned patent application which is incorporated by reference in its entirety: U.S. Provisional Patent Application Ser. No. 61/220,994, filed Jun. 25, 2009, titled REMOTE CONTROL FOR A HEARING ASSISTANCE DEVICE. Other triggering occurrences are possible without departing from the scope of the present subject matter.

3. DTMF Commands to Change Modes

In various embodiments dual tone multifunction (DTMF) tones are received by the hearing assistance device 110 and operating modes of radio 118 are changed based on the DTMF tones. Such tones can be received acoustically by microphone 112 from any audio source capable of generating such tones. The DTMF tones can also be send via a radio frequency message, received by radio 118, decoded and processed by processor 116 to perform mode changes. It is understood that various tone sequences and combinations can be used to change modes from normal operating mode to standby mode or vice versa. Thus, it is understood that a single tone, pair of tones, or sequence if tones can be employed without departing from the scope of the present subject matter.

In one embodiment a unique DTMF tone or sequence is used to enter standby mode and another unique tone or sequence is used to enter normal operating mode. In further embodiments, the same message could be used to toggle between the modes. In various embodiments, the duration of a tone is used to change modes of the radio 118.

In various embodiments, the DTMF tones or sequence of tones is generated by a cellular phone or other telephone device. The cellular phone may include a software or firmware application downloaded to it to convert the cell-phone into a multi-function remote that includes the capability of producing the necessary DTMF tones. Other platforms such as personal digital assistants PDA's, computers, or dedicated DTMF hardware equipped with audio outputs may be used to perform the remote control function. When two hearing aids are worn by a user, to ensure that both aids are enabled or disabled via DTMF it may be necessary to relay that information from one aid to the other via wireless transmissions prior to disabling the transmitter.

In one embodiment the hearing assistance device 110 may use the DTMF detection approach set forth in the following commonly owned patent application: U.S. Provisional Patent Application Ser. No. 61/176,734, filed May 8, 2009, titled CELL PHONE DETECTION FOR HEARING AIDS. Other DTMF approaches may be used without departing from the scope of the present subject matter.

In various embodiments, a voice activation algorithm is used to disable or re-enable the wireless transmissions or standby mode of a hearing aid. The wearer can disable wireless transmissions by using a voice command such as "deactivate wireless" or "wireless off" or conversely "Activate wireless" or "wireless on." Similar commands may used for entering or exiting standby mode. The commands may be processed and interpreted by a digital signal processing unit (DSP), central processing unit (CPU), or other hardware on the hearing aid. Upon processing, the CPU carries out the command to disable/enable the functions present in voice command.

The following commonly owned patent documents are each hereby incorporated by reference in their entirety: U.S. patent application Ser. No. 12/643,540, filed Dec. 21, 2009, titled LOW POWER INTERMITTENT MESSAGING FOR HEARING ASSISTANCE DEVICES; U.S. Patent Application Ser. No. 60/687,707 filed Jun. 5, 2005, titled COMMUNICATION SYSTEM FOR WIRELESS AUDIO DEVICES; U.S. patent application Ser. No. 11/447,617, titled COMMUNICATION SYSTEM FOR WIRELESS AUDIO DEVICES; U.S. Provisional Patent Application Ser. No. 61/176,734, filed May 8, 2009, titled CELL PHONE DETECTION FOR HEARING AIDS; and U.S. Provisional Patent Application Ser. No. 61/220,994, filed Jun. 25, 2009, titled REMOTE CONTROL FOR A HEARING ASSISTANCE DEVICE.

The present subject matter can be used for a variety of hearing assistance devices, including but not limited to, tinnitus masking devices, cochlear implant type hearing devices, hearing aids, such as behind-the-ear (BTE), in-the-ear (ITE), in-the-canal (ITC), or completely-in-the-canal (CIC) type hearing aids. It is understood that behind-the-ear type hearing aids may include devices that reside substantially behind the ear or over the ear. Such devices may include hearing aids with receivers associated with the electronics portion of the behind-the-ear device, or hearing aids of the type having receivers in the ear canal of the user, such as receiver-in-the-canal (RIC) or receiver-in-the-ear (RITE) designs. It is understood that other hearing assistance devices not expressly stated herein may fall within the scope of the present subject matter.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

What is claimed is:

1. A hearing assistance device for a wearer, comprising:

a microphone;

a receiver for playing sound to the wearer;

a processor connected to the microphone and the receiver; and a radio connected to the processor, wherein the processor is configured to place the radio into a low power or standby mode upon receipt of a dedicated predetermined command from one or more of the microphone or the radio, by deactivating the radio without using a power switch of the device.

2. The device of claim 1, wherein the processor is configured to place the radio into the low power mode upon receipt of a predetermined audio command from the microphone.

3. The device of claim 1, wherein the processor is configured to place the radio into the standby mode upon receipt of a predetermined audio command from the microphone.

4. The device of claim 1, wherein the processor is configured to place the radio into the low power mode upon receipt of a predetermined wireless command from the radio.

5. The device of claim 1, wherein the processor is configured to place the radio into the standby mode upon receipt of a predetermined wireless command from the radio.

6. The device of claim 1, wherein the processor is configured to exit the radio from the low power mode upon receipt of a predetermined audio command from the microphone.

7. The device of claim 1, wherein the processor is configured to exit the radio from the standby mode upon receipt of a predetermined audio command from the microphone.

8. The device of claim 1, wherein the processor is configured to exit radio from the low power mode upon receipt of a predetermined wireless command from the radio.

9. The device of claim 1, wherein the processor is configured to exit radio from the standby mode upon receipt of a predetermined wireless command from the radio.

10. The device of claim 1, wherein the processor is configured to receive the predetermined command via dual tone multifunction (DTMF) tones from the microphone or from the radio.

11. The device of claim 1, wherein the radio exits a low power or standby mode upon receipt of a predetermined command from one or more of the microphone or the radio.

12. The device of claim 1, wherein the processor is configured to exit radio from the low power or standby mode upon a triggering occurrence.

13. The device of claim 12, wherein the triggering occurrence includes a programmable timer reaching a setpoint.

14. A method of controlling modes of a hearing assistance device, comprising:

receiving a dedicated predetermined command at a hearing assistance device processor from one or more of a hearing assistance device microphone or a radio connected to the processor; and entering a low power or standby mode of the radio of the hearing assistance device upon receipt of the dedicated predetermined command to deactivate the radio without using a power switch of the device.

15. The method of claim 14, further comprising:

receiving a second predetermined command at a hearing assistance device processor from one or more of a hearing assistance device microphone or a radio connected to the processor; and exiting a low power or standby mode of the radio of the hearing assistance device.

16. The method of claim 14, wherein entering standby mode includes disabling processing of audio information.

17. The method of claim 14, wherein receiving a predetermined command includes receiving a DTMF tone sequence.

18. The method of claim 17, wherein receiving the DTMF tone sequence includes receiving the sequence from a cellular phone.

19. The method of claim 14, wherein entering standby mode includes disabling wireless radio frequency transmission.

20. The method of claim 14, wherein receiving a predetermined command includes receiving a voice activation command.

* * * * *